Figure 1:
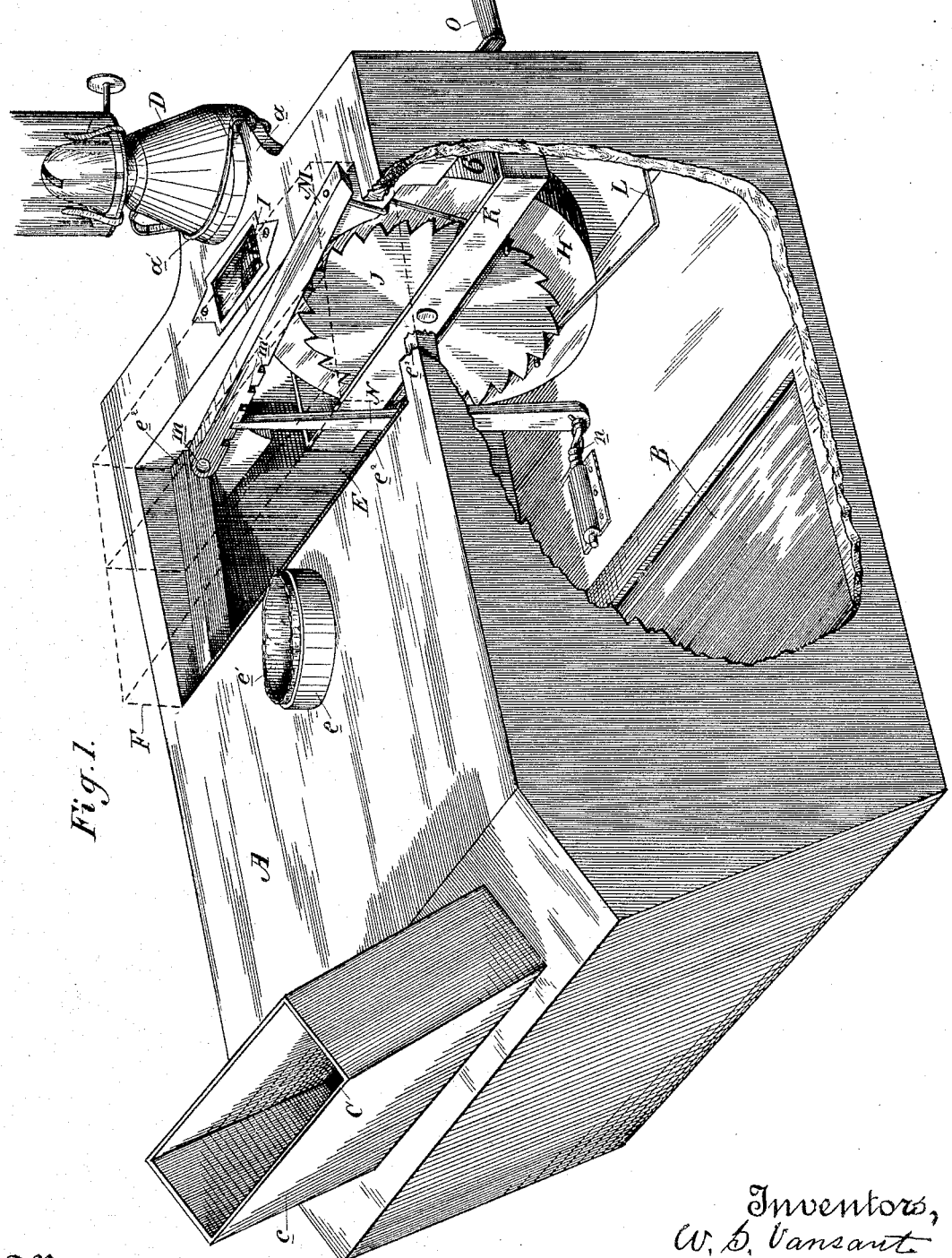

(Model.)

2 Sheets—Sheet 1.

W. S. VANSANT & R. W. COOKE.
EGG TESTER.

No. 351,542.

Patented Oct. 26, 1886.

Witnesses,
Geo. H. Strong
J. H. Rouse

Inventors,
W. S. Vansant
R. W. Cooke
By Dewey & Co.
Attorneys (Model.) 2 Sheets—Sheet 2.
W. S. VANSANT & R. W. COOKE.
EGG TESTER.
No. 351,542. Patented Oct. 26, 1886.
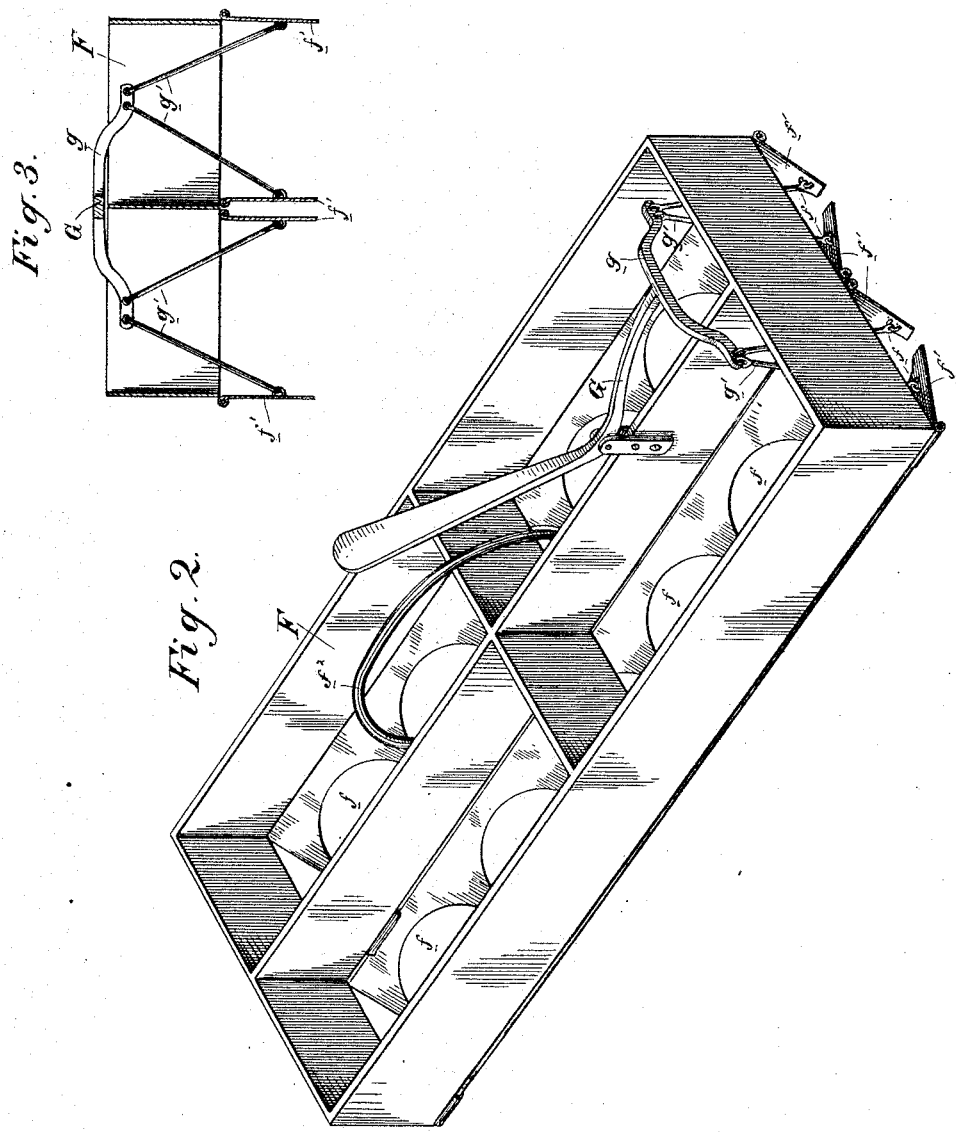
Witnesses:
Geo. H. Strong.
J. H. Nourse.
Inventors,
W. S. Vansant,
R. W. Cooke
By Dewey & Co.
Attorneys

UNITED STATES PATENT OFFICE.

WILLIAM S. VANSANT AND ROBERT W. COOKE, OF DIXON, CALIFORNIA.

EGG-TESTER.

SPECIFICATION forming part of Letters Patent No. 351,542, dated October 26, 1886.

Application filed January 27, 1886. Serial No. 189,979. (Model.)

*To all whom it may concern:*

Be it known that we, WILLIAM S. VANSANT and ROBERT W. COOKE, both of Dixon, Solano county, State of California, have invented an Improvement in Egg Tester, Counter, and Packer; and we hereby declare the following to be a full, clear, and exact description of the same.

Our invention relates to a new and useful egg tester, counter, and packer; and our invention consists in the devices hereinafter described and claimed.

The object of our invention is to provide an effective apparatus for testing, counting, and packing eggs, which apparatus is particularly useful in a grocery store or in commission houses where eggs are dealt in, though it may also be used in testing eggs for incubators.

Referring to the accompanying drawings for a more complete explanation of our invention, Figure 1 is a perspective view of our egg tester, counter, and packer, a portion of the side of the box or casing being broken away to show the interior, and the egg-tray being shown in dotted lines to avoid confusion. Fig. 2 is a perspective view of the egg-tray. Fig. 3 is a transverse section of same.

A is a box or casing, having located within it on the floor the mirror B. At one end of the top of the box is the sight-aperture C, guarded by a shade-flange, c. At the other end is a small shelf, a, provided with a wire clasp, a', which receives and holds the lamp D. In the top of the box is made a transverse opening, E, in front of which is a smaller and circular flanged opening, e, lined with some dark cloth, e', whereby the light is entirely excluded when the egg is fitted in said aperture.

F is the tray, provided with apertures f in its bottom, through which the eggs can be seen. The tray fits in the aperture E in the top of the box, and the operation of the device, as far as described, is as follows:

The eggs being placed in the tray, it is fitted in the aperture E, resting therein on suitable cleats, $e^2$. The operator, looking through the sight-aperture C, can see the eggs as reflected in the mirror B, and is thereby enabled by the assistance of the light of the lamp D, shining on the eggs from above, to determine their condition. When any particular egg is unusually doubtful, it is removed from the tray and placed in the small circular flanged aperture, whereby it is seen under more favorable conditions, and its condition can be determined more accurately.

The bottom of the tray F consists of sectional parts f', divided in each compartment on a central longitudinal line, each part having half of the aperture or perforation f made in it. These parts are hinged to the sides of the tray and to its central partition, whereby they are adapted to swing down to a vertical plane and to move up again to a horizontal plane, this movement being effected by means of a pivoted lever, G, having a yoke, g, on one end, connected with the sectional bottoms by means of links or rods g'. The central partition of the tray is provided with a handle, $f^2$, and in operating the tray this handle is grasped, while the lever G is held down by the thumb, thus holding the hinged sectional bottoms of the tray in a horizontal position and supporting the eggs. The cleats e' in the aperture E serve to hold the sectional bottoms in position when the tray is seated in said aperture. After the eggs have been tested, the operator lifts the tray from its seat, holding the lever G with his thumb, as before described, and carries said tray over to the usual packing-cases, which consist of divisional compartments, usually made of pasteboard. When the tray is placed over these packing-cases, the operator raises the end of the lever G with his thumb, whereby the other end is depressed and allows the eggs to fall gently into their respective compartments of the packing-case. The tray is then refilled with eggs, replaced upon the opening E, and the operation is continued.

It is advisable that the tray be made large enough to contain a dozen eggs, for facility in counting, which is accomplished automatically by the following device: Journaled in one end of the box in a vertical plane is a large wheel, H, on the periphery of which numbers are formed or secured, and are seen successively through a glazed aperture, I, in the top of the box, just above the periphery of the wheel. Upon the axle of the wheel is secured a ratchet-wheel, J, which is operated by an actuating-pawl, K, and a retaining-pawl, L. The actuating-pawl is secured to a lever, M, which forms one of the cleats of the aperture E in the box, and serves to support one side of the tray. This lever is pivoted at a point, $m$, and is held in a raised position by means of a bar or rod, N, bearing under it and actuated by a spring, $n$, at its lower end. The tension of this spring-bar is regulated by fitting it in any of the several notches $m'$ in the lever, whereby said lever may be returned to its elevated position with greater or less force, as may be required. The actuating-pawl is so arranged that when the lever is depressed it slips over a tooth of the ratchet-wheel, and as it rises it catches in said tooth and turns the wheel one position, and the retaining-pawl is arranged to keep the wheel from moving back. A crank, O, on the axle of the wheel H allows it to be rapidly rotated to an initial position.

The operation of this indicating device is as follows: When the tray, with its dozen eggs, is placed in the aperture E of the box ready for inspection, it forces down the lever M, so that the actuating-pawl K slips a tooth of the wheel, the retaining-pawl holding the wheel in position. After the eggs are inspected, the tray being removed, the lever M rises under the influence of its spring-bar N, carrying up the retaining-pawl with it, thereby turning the ratchet-wheel one tooth and the large wheel one number, so that the succeeding number is seen through the glazed aperture and indicates the number of dozens previously inspected.

With such an apparatus as we have described the work of inspecting the eggs, of keeping count of them as the inspection continues, and of packing them in their cases is carried on expeditiously and accurately.

Having thus described our invention, what we claim as new, and desire to secure by Letters Patent, is—

1. The box or casing A, having a reflector, B, in its bottom, a sight-aperture, C, an aperture, E, for the reception of an egg-tray, and a circular flanged aperture, $e$, for the reception of a single egg in its top, in combination with a perforated or apertured egg-tray fitting in the aperture E in the top of the box, and a lamp, D, arranged to direct its light upon the eggs in the tray, substantially as herein described.

2. In combination with a box or casing having a reflector and a sight-aperture, as described, the egg-tray F, fitting an aperture in said box and having perforated sectional hinged bottoms $f'$, swinging from a central line in a horizontal plane to a vertical plane, whereby the eggs, after being inspected, can be discharged into the packing-cases, substantially as herein described.

3. In combination with the box A, having the reflector B and a sight-aperture, C, the egg-tray F, fitted in said aperture and supported on cleats therein, said tray having perforated sectional hinged bottoms $f'$, and the means by which said bottoms are operated to discharge the eggs into the packing-cases after being inspected, consisting of the pivoted lever G, connected by links or rods with the sectional hinged bottoms, substantially as herein described.

4. The box or casing A, having a mirror, B, in its bottom, a sight-aperture, C, and an aperture, E, for the reception of an egg-tray in its top, in combination with a removable egg-tray fitting said aperture and an enumerating device in the box, substantially as herein described.

5. The box A, having a mirror, B, in its bottom, a sight-aperture, C, and an aperture, E, in its top, and the removable egg-tray having tilting divided bottom fitting aperture E, in combination with a pivoted spring-actuated lever, M, in said aperture and on which the tray rests, and an enumerating device in the box, substantially as herein described.

6. An egg tester, counter, and packer, comprising the box or casing A, the mirror B in its bottom, the sight-aperture C, the aperture E, and the lamp D on its top, the egg-tray F, having perforated sectional hinged bottoms $f$, a lever for operating said bottom to discharge the eggs, the spring-actuated lever M, and an enumerating device in the box, substantially as herein described.

In witness whereof we have hereunto set our hands.

WILLIAM S. VANSANT.
ROBERT W. COOKE.

Witnesses:
ROBERT HARKINSON,
RICHARD HALL.